United States Patent
Gallein et al.

(10) Patent No.: US 6,477,224 B1
(45) Date of Patent: Nov. 5, 2002

(54) RADIATION DETECTOR, PARTICULARLY OF A COMPUTED TOMOGRAPHY APPARATUS

(75) Inventors: Dieter Gallein, Rosstal (DE); Claus Pohan, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/557,762

(22) Filed: Apr. 25, 2000

(30) Foreign Application Priority Data

May 12, 1999 (DE) .......................... 199 21 992

(51) Int. Cl.⁷ ................................. A61B 6/00

(52) U.S. Cl. ............................. 378/19; 378/4

(58) Field of Search ............... 378/4, 19, 98.8; 250/370.1; 361/695; 381/353

(56) References Cited

U.S. PATENT DOCUMENTS

| | | | |
|---|---|---|---|
| 4,571,495 A | * 2/1986 | Distler et al. | ................. 250/394 |
| 4,845,731 A | * 7/1989 | Vidmar et al. | ......... 250/339.02 |
| 5,473,163 A | 12/1995 | Schmidt et al. | |
| 5,804,832 A | 9/1998 | Crowell et al. | |
| 6,098,822 A | * 8/2000 | Wofford | .................... 211/186 |

FOREIGN PATENT DOCUMENTS

| | | |
|---|---|---|
| DE | OS 41 23 871 | 1/1992 |
| DE | OS 40 35 696 | 5/1992 |
| FR | 2 732 474 | 3/1995 |

* cited by examiner

Primary Examiner—Robert H. Kim
Assistant Examiner—Hoon K. Song
(74) Attorney, Agent, or Firm—Schiff Hardin & Waite

(57) ABSTRACT

Radiation detector, particularly for a computed tomography apparatus has at least one measuring electronics board that at least amplifies the electrical signals generated by a radiation transducer due to radiation incident thereon, which is seated relative to a bearing plate via one or more vibration damping elements.

7 Claims, 1 Drawing Sheet

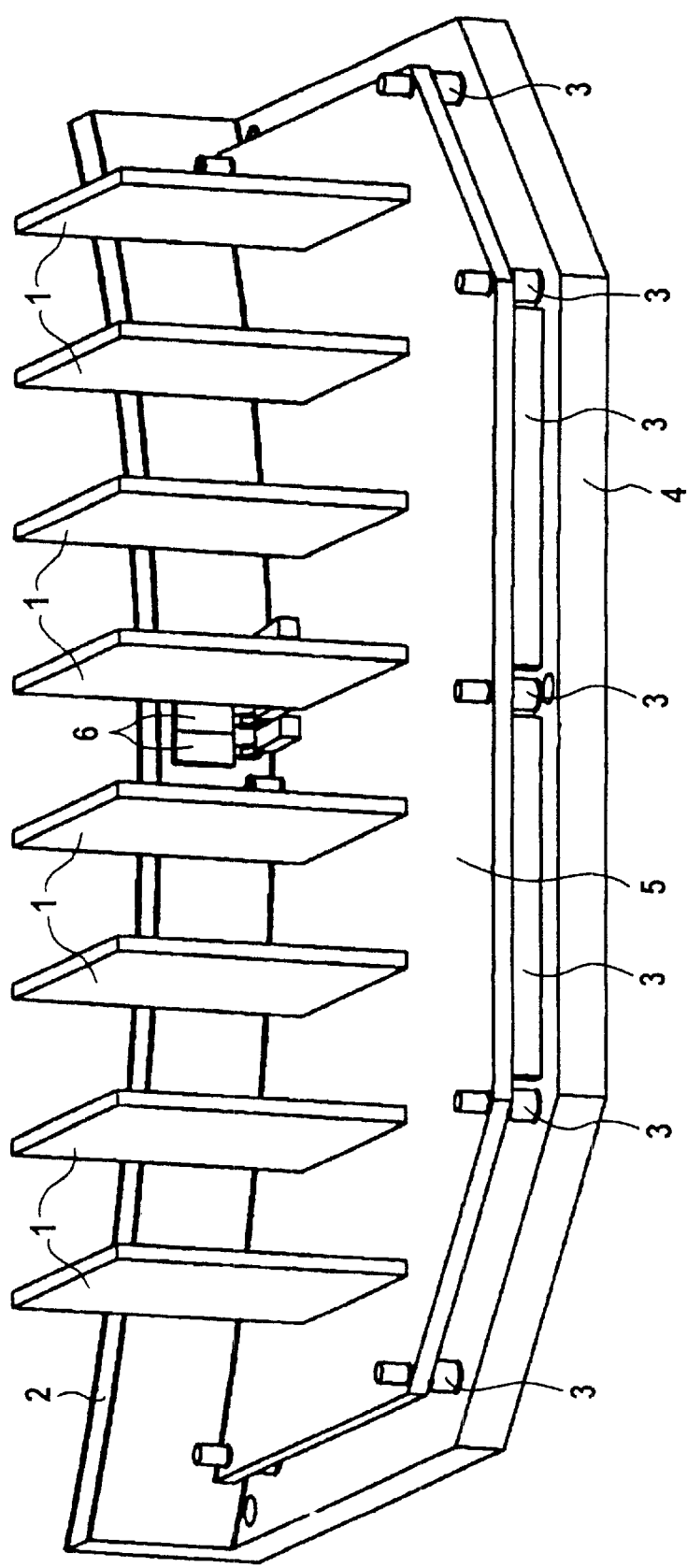

RADIATION DETECTOR, PARTICULARLY OF A COMPUTED TOMOGRAPHY APPARATUS

BACKGROUND OF THE INVENTION

1. Field of the Invention

The present invention is directed to a radiation detector of a type suitable for use in a computed tomography apparatus.

2. Description of the Prior Art

German OS 40 35 696 discloses a data measuring system unit for a computed tomography apparatus that has a detector arrangement composed of individual measuring channels that are electrically connected via a printed circuit board to evaluation electronics allocated to the measuring channels, and the evaluation electronics being directly connected to the printed circuit board via a plug connection. When the measuring system unit is adjusted in rotating fashion around an examination region for radiation sampling, vibrations arising as a result thereof can lead to disturbances, for example to tribo-electricity and microphony that disadvantageously influence the signals in the measuring channels due to a boost in noise. The noise can produce artifacts in an image that is calculated from the signals by a computer and presented at a display.

SUMMARY OF THE INVENTION

An object of the present invention is to provide a radiation detector of the type described above wherein these undesired effects no longer occur, or are minimized as much as possible.

This object is inventively achieved in a radiation detector, particularly for a computed tomography apparatus, having measuring electronics that at least amplifies electrical signals generated by a radiation transducer due to radiation incident thereon, with the measuring electronics being seated relative to a bearing plate via a vibration damping arrangement. As a result of the vibration damping arrangement, disturbances generated by vibrations are attenuated such that the electrical signals enable a good basis for artifact-free image presentation due to the reduction of the noise.

It is advantageous when the radiation transducer is in direct communication with the bearing plate, since the bearing plate is then stationary with reference to the incident fan ray beam of a radiation transmitter.

Disturbances of the electrical signals caused by vibrations can be especially effectively alleviated when a vibration damping element or elements is/are provided for each measuring electronics board.

The use of shared vibration damping elements each allocated to a number of measuring electronics boards, still affords advantages, however, and somewhat more economical.

The vibration damping elements can be implemented as rubber-metal bearings since these damp vibrations occurring during operation of, in particular, a computed tomography apparatus especially effectively.

It is advantageous for further improvement of the vibration damping when the vibration damping elements are additionally or alternatively composed of soft-elastic material, which are constructed as well as the rubber-metal bearings, in view of their elasticity and vibration damping so that no resonance phenomena occur during the operation of the computed tomograph. The soft-elastic material preferably is implemented as damping strips.

DESCRIPTION OF THE DRAWINGS

The single FIGURE shows a radiation detector constructed in accordance with the principles of the present invention.

DESCRIPTION OF THE PREFERRED EMBODIMENTS

The FIGURE shows a radiation detector, particularly for a computed tomography apparatus, that has at least one measuring electronics on a number of boards 1 to which the signals of a radiation transducer 2 are supplied. The radiation transducer 2 can be implemented, for example, as a solid-state detector (i.e., scintillators in combination with elements converting light into electrical signals) or as a Xe detector. The (solid-state) radiation transducer 2 preferably has individual radiation-converting elements 6 joined to one another to which radiation-absorbent lamellae are allocated, these lamellae extending at least approximately perpendicularly relative to the surface of the radiation-converting elements 6 onto which the radiation of a radiation transmitter is incident. A number of measuring electronics boards 1 are provided in the exemplary embodiment, these being arranged at a bearing plate 4 via vibration damping elements 3 individually, combined into groups or in common. In the exemplary embodiment a common motherboard 5 for the measuring electronics boards 1 is in communication with the bearing plate 4 via the vibration damping elements 3. The vibration damping elements 3 are implemented such that the vibrations occurring during operation of a computed tomography apparatus are adequately damped and do not lead to resonance phenomena of the measuring electronics boards 1 and/or of the mother board 5. For this purpose, rubber-metal bearings or soft-elastic material, particularly damping strips, have proven beneficial. By adaptation or tuning of the soft-elastic material, it is possible to shift the resonant frequency of the measuring electronics boards 1 and/or of the mother circuit board 5 into such a range that these components cannot be caused to oscillate due to vibrations during the operation of the computed tomography apparatus. It also proceeds from the figure that radiation-converting elements 6 are arranged directly on the bearing plate 4 and—via the bearing plate 4—thus also have a stationary reference to the radiation transmitter during the operation of the computed tomography apparatus. An adjustment thus can be advantageously eliminated using precise fastening means of the bearing plate 4 with reference to a rotating frame, at which the radiation transmitter is also arranged lying opposite the radiation detector.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiation detector for a computed tomography apparatus, comprising:

a radiation transducer which produces electrical signals dependent on radiation incident thereon;

a plurality of measuring electronics boards electrically connected to said radiation transducer for respectively receiving said electrical signals therefrom, said measuring electronics boards at least amplifying the respective electrical signals;

a support plate with which said radiation transducer is in direct connection; and a vibration damping assembly mounted on said support plate and in mechanical connection with said measuring electronics boards, said vibration damping assembly being disposed between said support plate and said measuring electronics boards.

2. A radiation detector as claimed in claim 1 wherein said vibration damping assembly comprises a plurality of vibration damping elements, with at least one vibration damping element being provided for each of said measuring electronics boards.

3. A radiation detector as claimed in claim 1 wherein said vibration damping assembly comprises a plurality of vibration damping elements shared by said plurality of measuring electronics boards.

4. A radiation detector as claimed in claim 1 wherein said vibration damping assembly comprises vibration damping elements composed of soft elastic material.

5. A radiation detector as claimed in claim 1 wherein said vibration damping assembly comprises vibration damping elements comprised of rubber-metal bearings.

6. A radiation detector as claimed in claim 1 wherein said vibration damping assembly comprises vibration damping elements comprised of damping strips.

7. A radiation detector as claimed in claim 1 further comprising a motherboard to which measuring electronics board are electrically and mechanically connected, said motherboard providing said mechanical connection between said vibration damping assembly and said measuring electronics boards.

* * * * *